United States Patent [19]

Finnegan

[11] Patent Number: 4,573,839
[45] Date of Patent: Mar. 4, 1986

[54] MOUNTING CHUCK FOR A DRILL HAVING REVERSIBLE TOOLS THEREIN

[76] Inventor: Danny Finnegan, 6840 Hickory Ave., Orangevale, Calif. 95662

[21] Appl. No.: 408,623

[22] Filed: Aug. 16, 1982

[51] Int. Cl.[4] .............................................. B23B 31/06
[52] U.S. Cl. .................... 408/239 R; 81/438; 279/1 B; 279/30; 279/75
[58] Field of Search ........... 408/117, 118, 119, 239 R, 408/239 A; 279/76, 77, 78, 79, 80, 82, 30, 75, 1 B, 1 A; 81/438, 439, 461, 90 D, 121.7

[56] References Cited

U.S. PATENT DOCUMENTS

| | | | |
|---|---|---|---|
| 2,558,158 | 6/1951 | Rock | 81/438 X |
| 2,984,334 | 6/1961 | Wendling | 279/79 X |
| 3,007,504 | 11/1961 | Clark | 81/438 X |
| 3,023,015 | 2/1962 | Pankow | 279/14 |
| 3,086,414 | 4/1963 | Nardi | 81/90 D |
| 3,378,905 | 4/1968 | Szohatzky | 279/76 X |
| 3,762,733 | 10/1973 | Lana | 279/103 |
| 3,788,658 | 1/1974 | Benjamin et al. | 279/75 |
| 3,893,677 | 7/1975 | Smith | 279/82 X |
| 4,275,893 | 6/1981 | Belanceri | 279/75 X |

Primary Examiner—Gil Weidenfeld
Assistant Examiner—Glenn L. Webb
Attorney, Agent, or Firm—Jacobs, Mark C.

[57] ABSTRACT

A mounting chuck for attachment to a drill having a rotatable collar on a main chuck portion. The main chuck portion includes a cavity receiving therein a tool mount having a tool removably secured therein at either or both ends thereof. The mount conforms to the cavity and the collar encircles both the cavity and the mount to selectively either retain the mount in fixed position on the chuck portion or allow the mount to be removed therefrom. The chuck portion includes a hollow axially extending chamber so that one of the tools on the mount may extend into the chamber while the other tool on the mount extends out from the chuck portion in an operative position. In this manner, the tools on the mount may differ and either tool may be quickly and easily selected.

9 Claims, 60 Drawing Figures

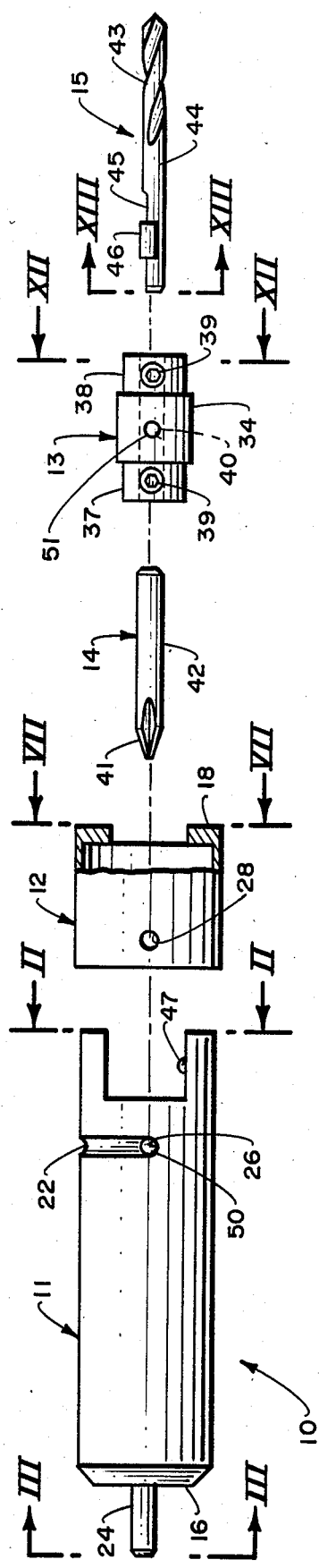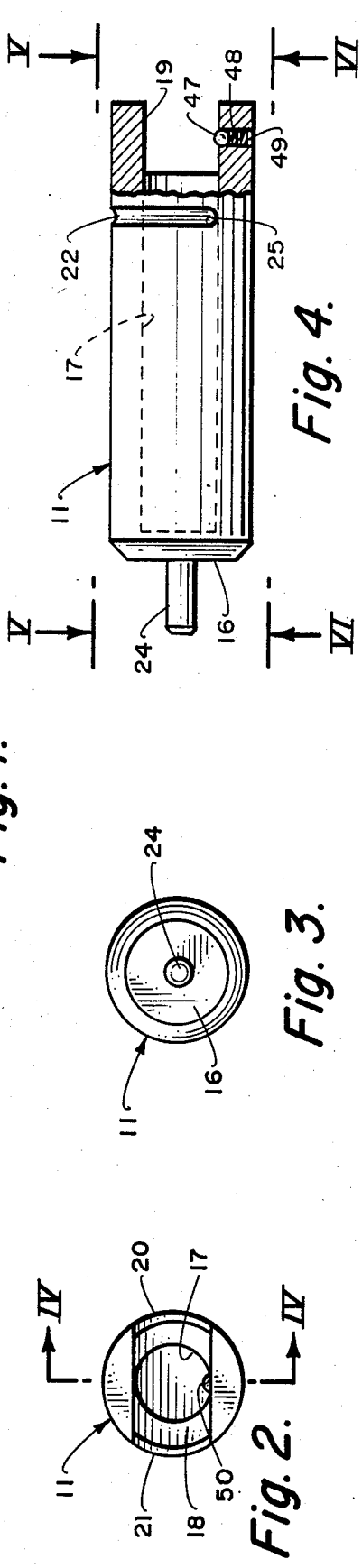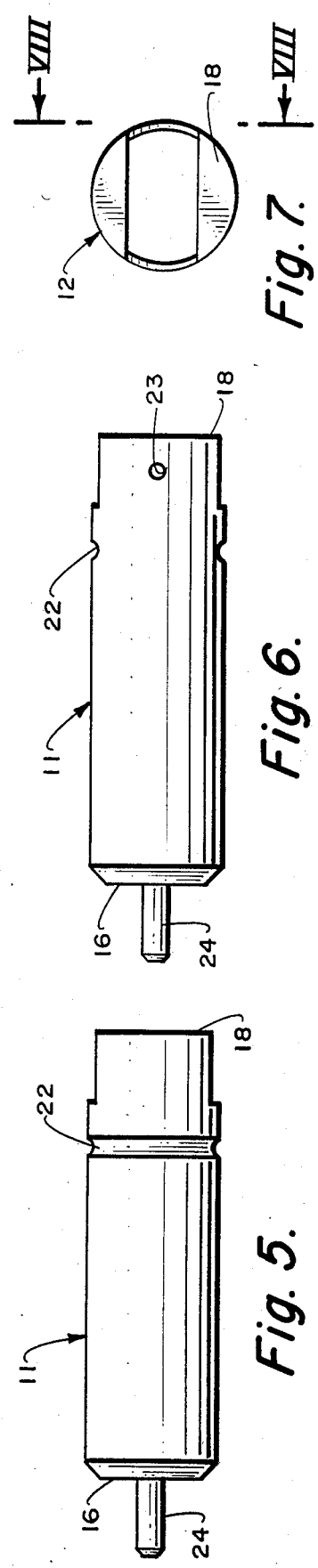

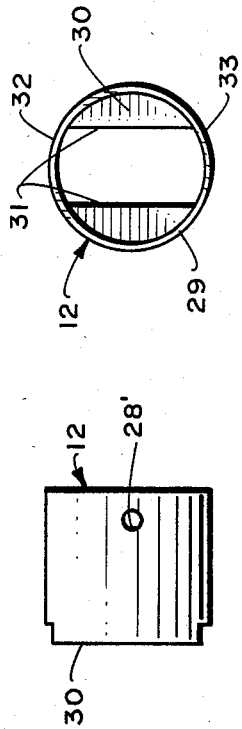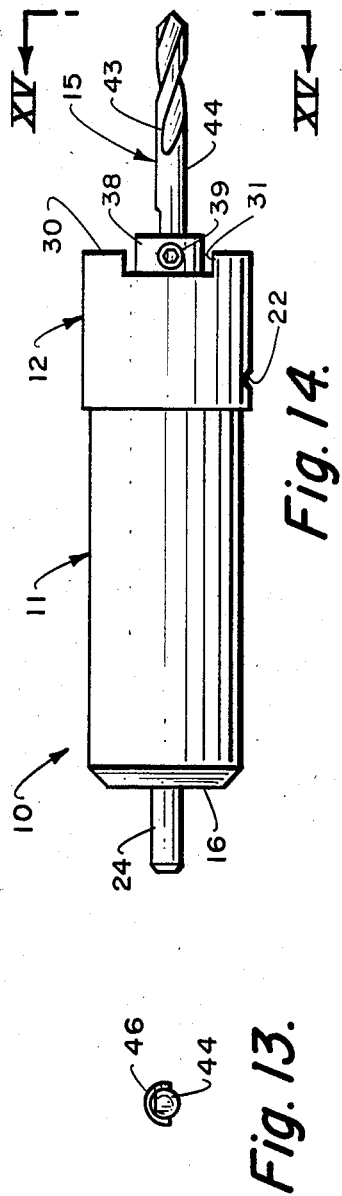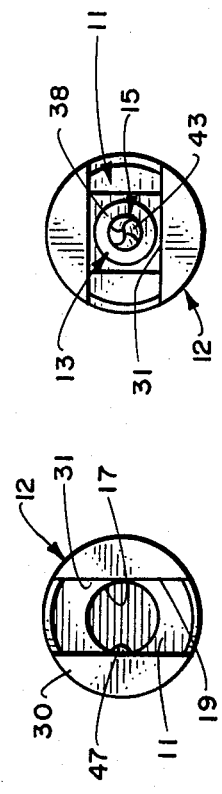

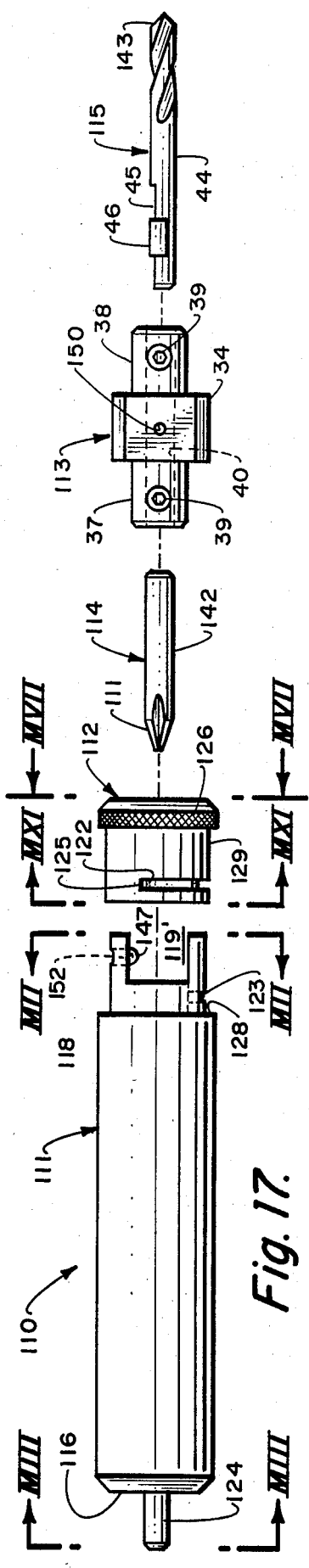

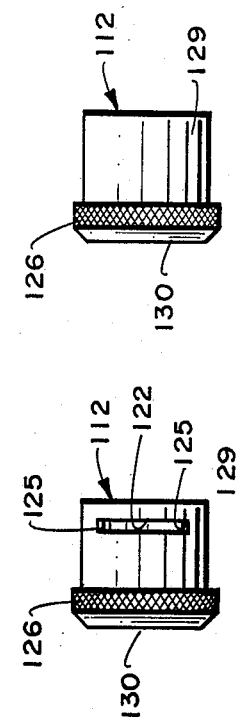 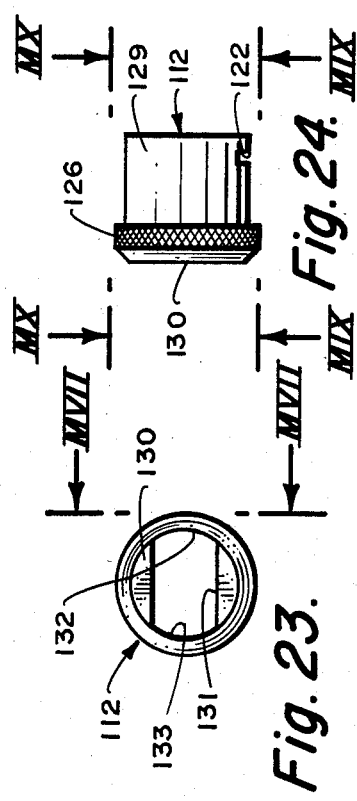 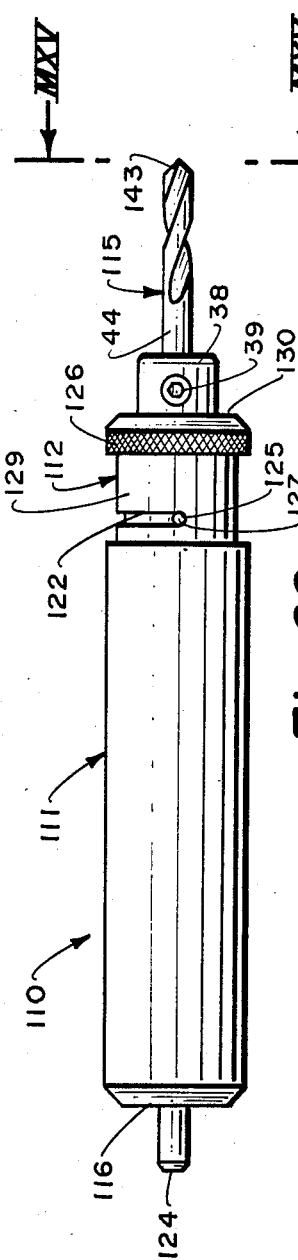 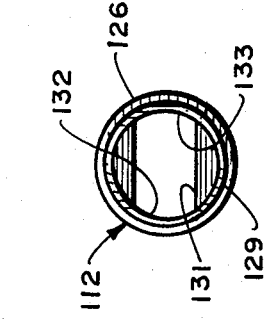 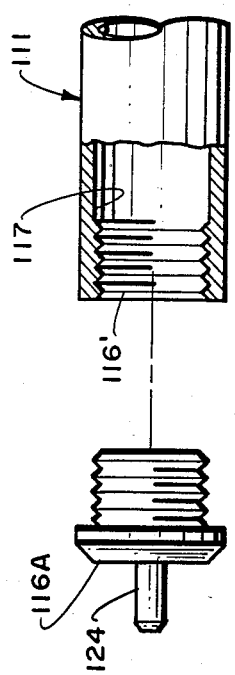 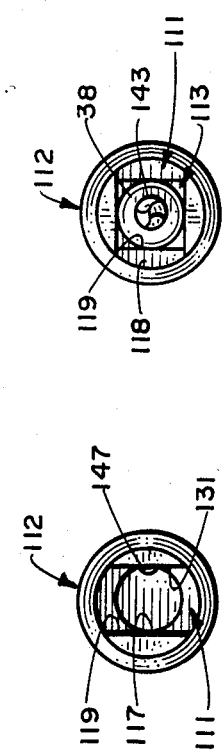

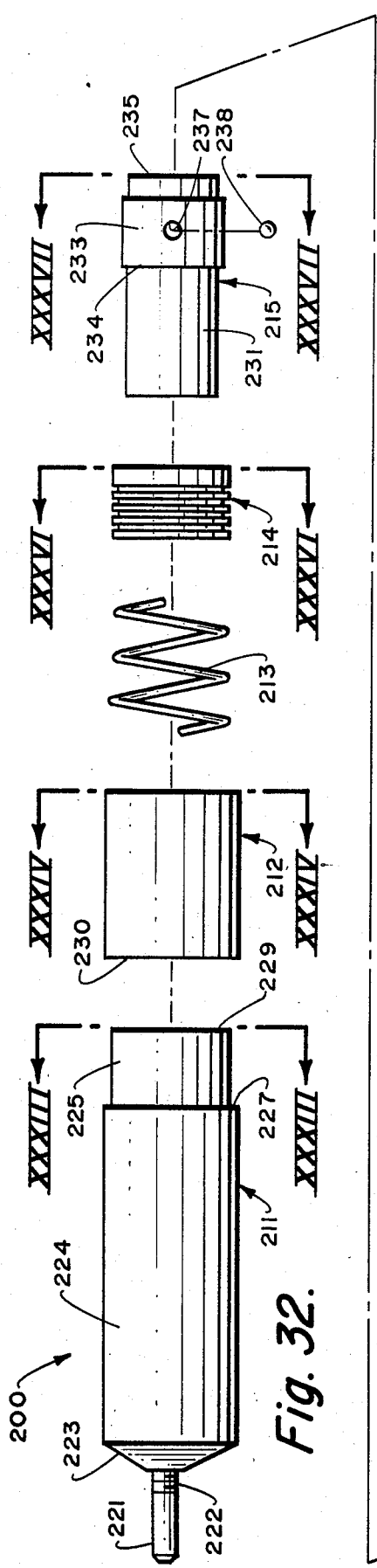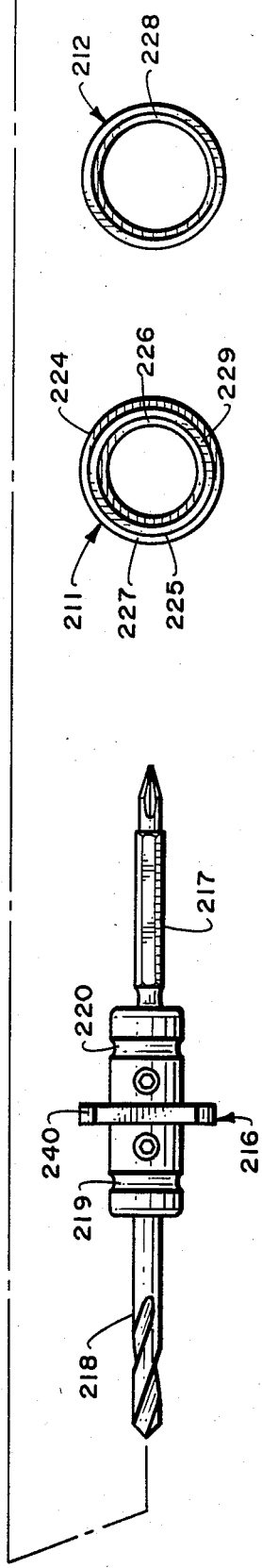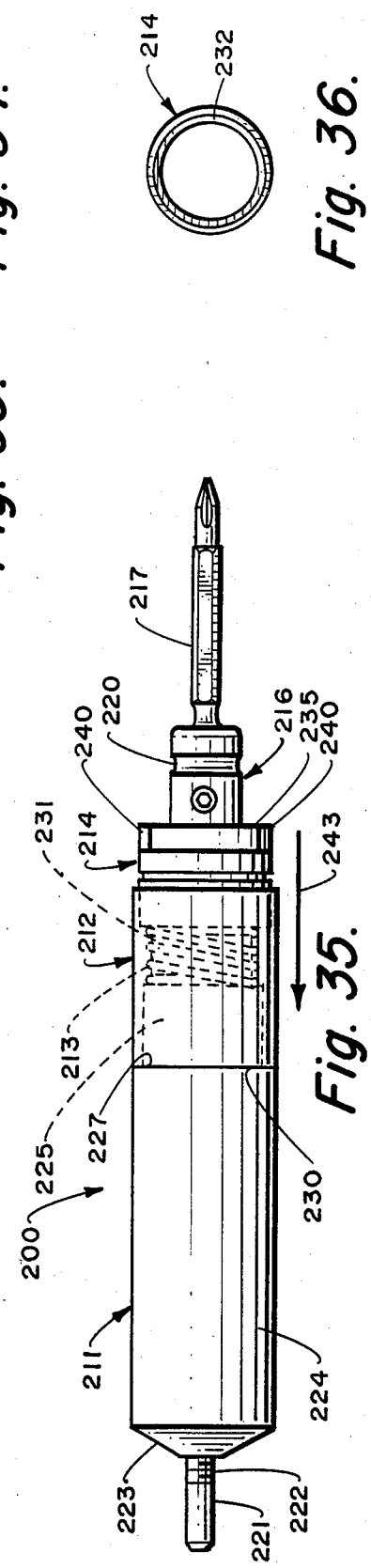

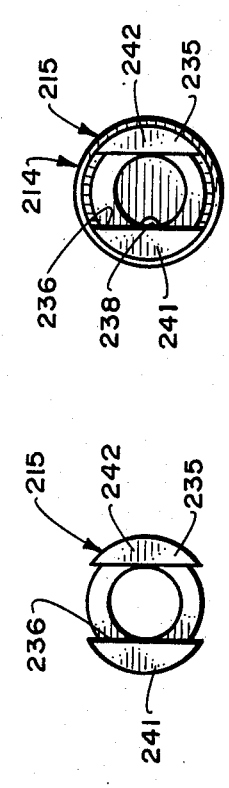
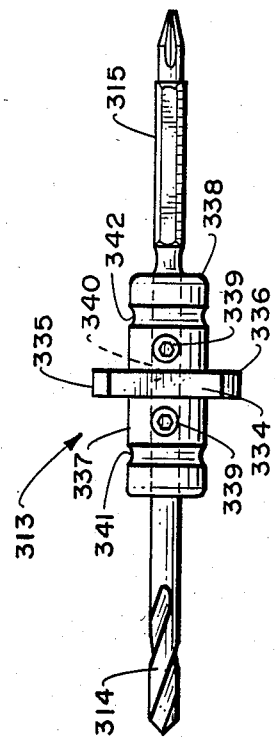
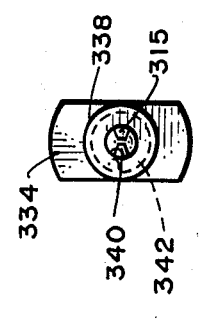
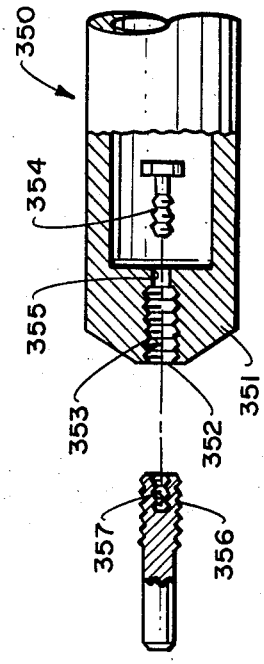
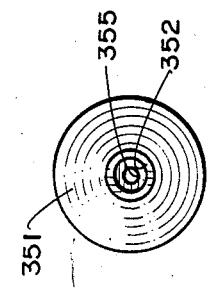
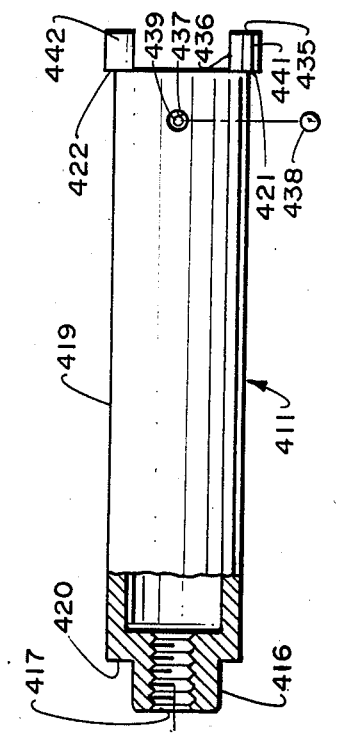
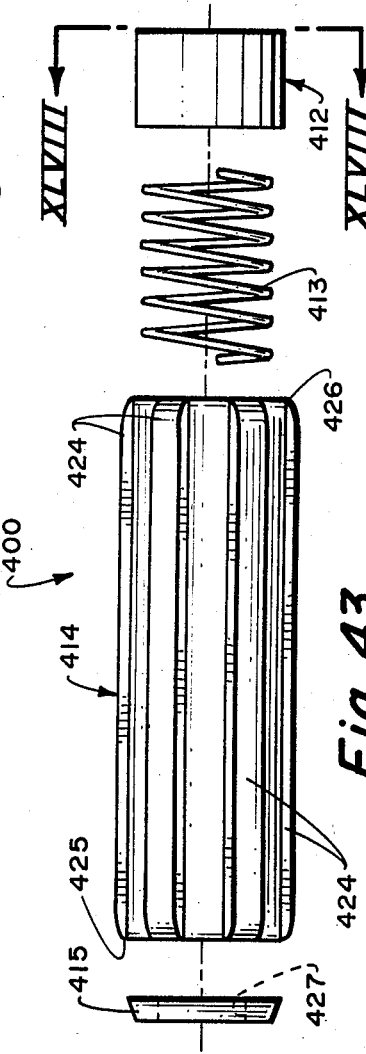

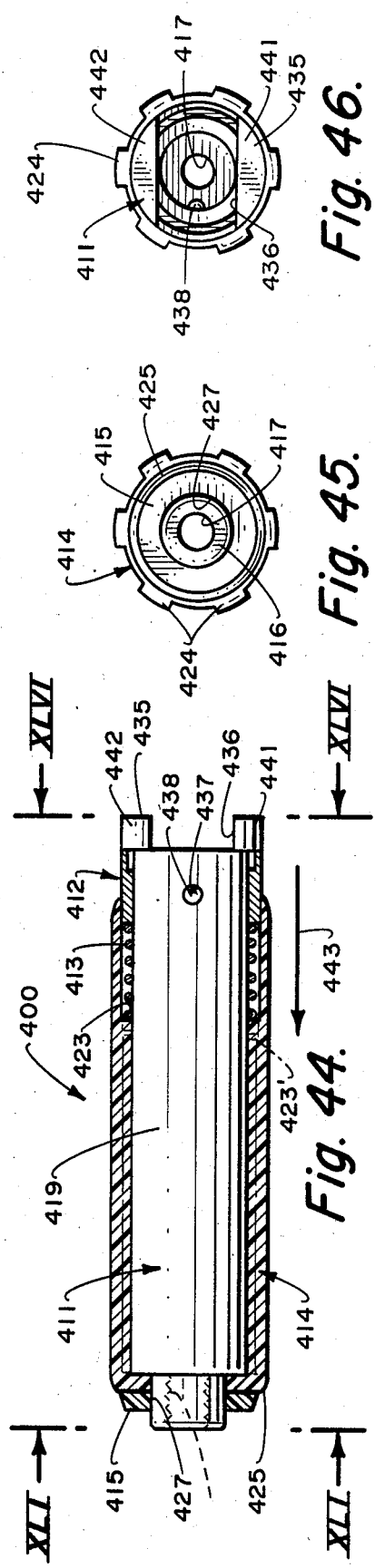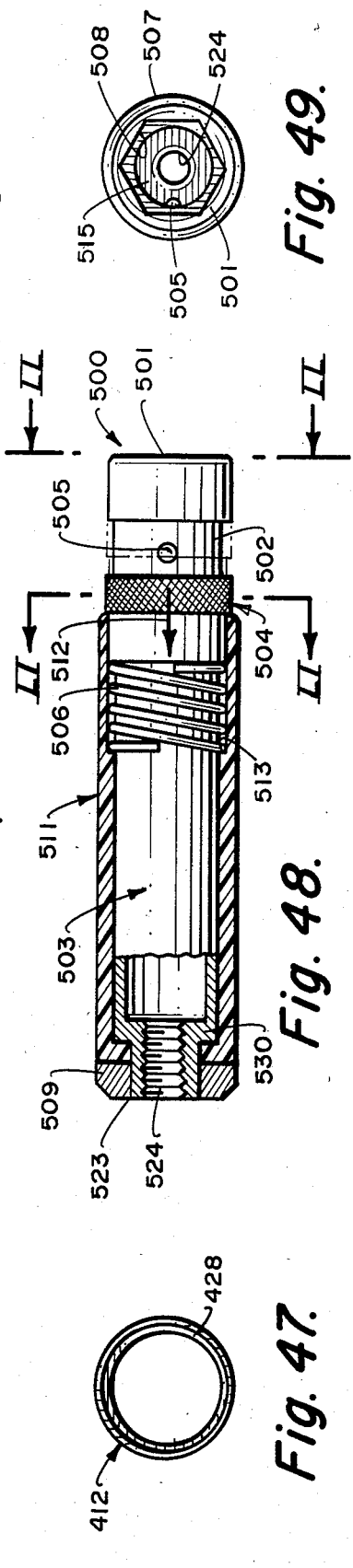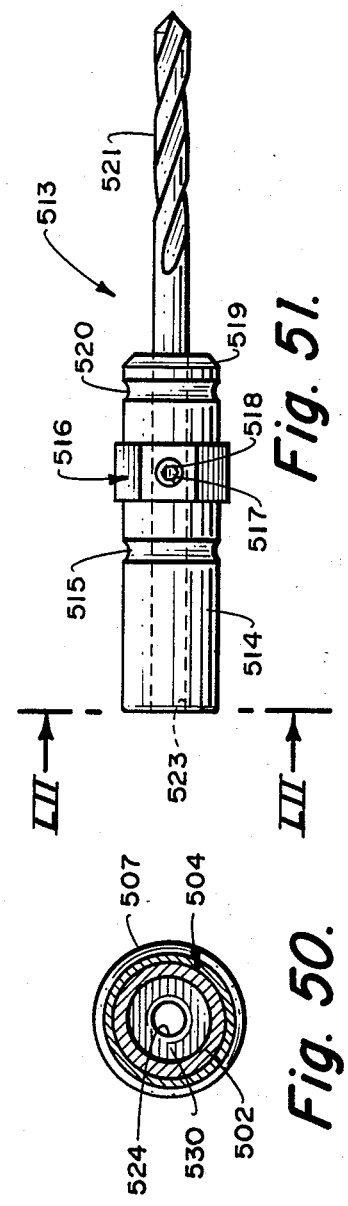

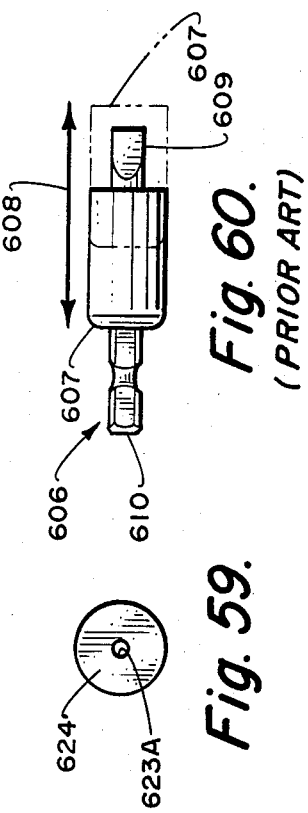
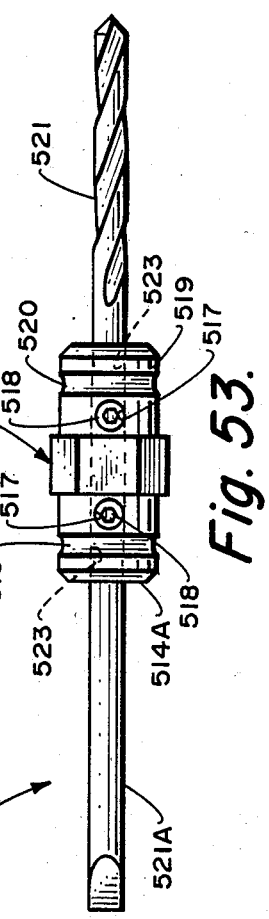
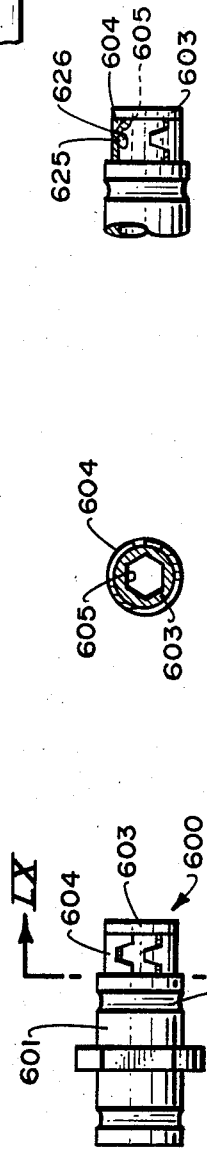
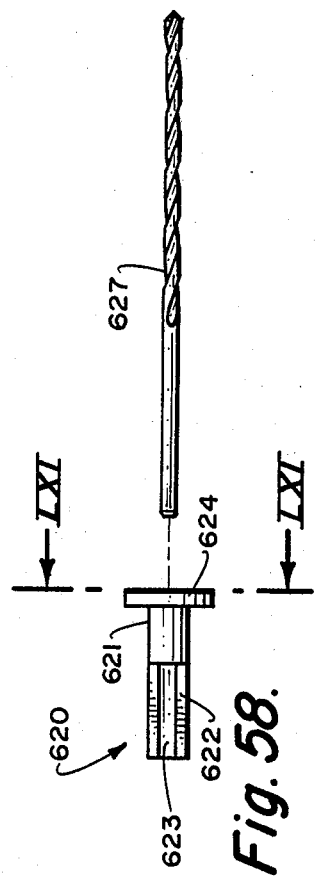

MOUNTING CHUCK FOR A DRILL HAVING REVERSIBLE TOOLS THEREIN

BACKGROUND OF THE INVENTION

1. Field of the Invention

The invention relates to mounting chucks; and, more particularly, to a mounting chuck for a drill having reversible tools thereon.

2. Description of the Prior Art

It is well known that an ordinary drill may be quickly and easily adapted to secure various work tools, such as sanders, extra large drill bits, etc, thereto. Normally, such drills include a conventional main chuck portion which is fixedly secured to the main drill housing the motor therein. Drill bits or the like may be selectively secured to the main chuck portion using a chuck key which tightened a screw, such as an allen screw, against the bit when inserted into the chuck portion. In like manner, the aforementioned auxiliary tools may be selectively attached to the main chuck portion by insertion therein and securement via the screw and chuck key.

In using such drills, it is often desirable to use one type or size of drill bit, then another. Normally, this entails removal of one bit and insertion of the other. Obviously, this involves locating and placing the bits where they can be quickly and easily retrieved. In practice, it would be very convenient to have these differing bits on a single mount so that one or the other may be quickly and easily selected depending on the operation desired.

There is thus a need for a chuck which can be quickly and easily attached to a drill and has differing bits mounted thereon which can be quickly and easily selected.

SUMMARY OF THE INVENTION

It is an object of this invention to provide a removable chuck for a drill or the like having differing bits mounted therein.

It is still another object of this invention to provide such a chuck where one of the bits may be selected and mounted in the chuck with the outer bit disposed internally of the chuck.

It is still another object of this invention to provide such a chuck which includes a rotatable collar movable between bit locking positions for quickly and easily locking or unlocking the mount for the bits from the chuck.

These and other objects are preferably accomplished by providing a mounting chuck for attachment to a drill having a rotatable collar on a main chuck portion. The main chuck portion includes a cavity receiving therein a tool mount having a tool removably secured thereto at either or both ends thereof. The mount conforms to the cavity and the collar encircles both the cavity and the mount to selectively either retain the mount in fixed position on the chuck portion or allow the mount to be removed therefrom. The chuck portion includes a hollow axially extending chamber so that one of the tools on the mount may extend into the chamber while the other tool on the mount extends out from the chuck portion in an operative position. In this manner, the tools on the mount may differ and either tool may be quickly and easily selected.

BRIEF DESCRIPTION OF THE DRAWINGS

FIG. 1 is an exploded view of the first embodiment of this invention and the tool to be utilized therewith.
FIG. 2 is a view taken along lines II—II of FIG. 1.
FIG. 3 is a view taken along lines III—III of FIG. 1.
FIG. 4 is a view taken along lines IV—IV of FIG. 2.
FIG. 5 is a view taken along lines V—V of FIG. 4.
FIG. 6 is a view taken along lines VI—VI of FIG. 4.
FIG. 7 is a view taken along lines VII—VII of FIG. 1.
FIG. 8 is a view taken along lines VIII—VIII of FIG. 7.
FIG. 9 is a view taken along lines IX—IX of FIG. 8.
FIG. 10 is a view taken along lines X—X of FIG. 8.
FIG. 11 is a view taken along lines XI—XI of FIG. 1.
FIG. 12 is a view taken along lines XII—XII of FIG. 1.
FIG. 13 is a view taken along lines XIII—XIII of FIG. 1.
FIG. 14 is an essembled view of the chuck of FIG. 1.
FIG. 15 is a view taken along lines XV—XV of FIG. 14 shown with tool holder removed.
FIG. 16 is a view similar to FIG. 15 showing an alternate position of the parts thereof with tool holder.
FIG. 17 is an exploded view of the second embodiment of this invention which utililzes the tool shown in FIG. 1.
FIG. 18 is a view taken along the line MII of FIG. 17.
FIG. 19 is a view taken along line MIII—MIII of FIG. 17.
FIG. 20 is a view taken along line MIV—MIV of FIG. 18.
FIG. 21 is a view taken along line MV—MV of FIG. 20.
FIG. 22 is a view taken along line MVI—MVI of FIG. 20.
FIG. 23 is a view taken along line MVII—MVII of FIG. 17.
FIG. 24 is a view taken along line MVIII—MVIII of FIG. 23.
FIG. 25 is a view taken along line MIX—MIX of FIG. 24.
FIG. 26 is a view taken along line MX—MX of FIG. 24.
FIG. 27 is a view taken along line MXI—MXI of FIG. 17.
FIG. 28 is an elevational view of the chuck of the second embodiment as seen in FIG. 17.
FIG. 29 is a view similar to FIG. 15 of the first embodiment, here taken along line MXV—MXV of FIG. 28 shown with tool holder removed.
FIG. 30 is a view similar to FIG. 29 showing a second position of the parts thereof with tool holder.
FIG. 31 is a side view, partly in section of a variation of a part of this invention.
FIG. 32 is an exploded view of a third embodiment of the invention.
FIG. 33 is a view taken along lines XXXIII—XXXIII of FIG. 32.
FIG. 34 is a view taken along the lines XXXIV—XXXIV of FIG. 32.
FIG. 35 is an assembled view of the embodiment of FIG. 32.
FIG. 36 is a view taken along lines XXXVI—XXXVI of FIG. 32.
FIG. 37 is a view taken along lines XXXVII—XXXVII of FIG. 32.

FIG. 38 is a view similar to FIG. 37 showing the sleeve of FIG. 32 mounted on the tool retainer of FIG. 32.

FIG. 39 is a view similar to that of FIG. 1 but limited to only a portion thereof for a variant of element 13.

FIG. 40 is a view similar to that of FIG. 12 for the variant.

FIG. 41 is a cross sectional view in a tools' body portion mode of mounting.

FIG. 42 is a bottom plan view of the embodiment of FIG. 41.

FIG. 43 is an exploded view partly in section of a fourth embodiment of this invention.

FIG. 44 is an assemnbled view of the device of FIG. 43.

FIG. 45 is a view along the line XLI—XLI of FIG. 44.

FIG. 46 is a view along the line XLVI—XLVI of FIG. 44.

FIG. 47 is a view taken along the line XLVIII—XLVIII of FIG. 43

FIG. 48 is a side plan view of a variant of one portion of this invention, with the collar retraced to show the ball used to engage another portion of the invention not shown in this figure.

FIG. 49 is a view along the line L—L of FIG. 48.

FIG. 50 is a view along the line LI—LI of FIG. 48

FIG. 51 is a view similar to FIG. 39 but for the hexagonal engaging portion of the tool receiver.

FIG. 52 is a view along the line LII—LII.

FIG. 53 is a view similar to FIG. 51 but for a tool holder adapted to receive two bits or drivers not one.

FIG. 54 is a side view of a conventional ¼" electrical drill or equivalent with the standard chuck removed.

FIG. 55 is a side view of a variant of the toolholders of this invention.

FIG. 56 is a front view thereof taken along the line IX—IX.

FIG. 57 is a closeup of a portion of FIG. 55.

FIG. 58 is side view of a bit adapter employable with the toolholders forming part of the subject matter of this invention.

FIG. 59 is a front view of the devcie of FIG. 58.

FIG. 60 is prior art.

DESCRIPTION OF THE PREFERRED EMBODIMENT

Referring now to FIG. 1 of the drawing, a mounting chuck 10 in accordance with the invention is shown in exploded view. Chuck 10 is comprised of three main elements, a main chuck body portion 11, a rotatable sleeve or collar 12 and a tool holder 13. Tool holder 13 is adapted in turn to retain therein one or more tools, such as tools 14 and 15, as will be discussed further hereinbelow. Main body portion 11 will be discussed first. As shown in Figs. 1 and 2, main body portion 11 is generally cylindrical having a closed rear end 16 (FIG. 3) and a throughbore 17 opening at front end 18 (FIG. 2). As shown in FIG. 4, front end 18 terminates in a cut-out section 19 which, as seen in FIG. 2, is generally rectangular in cross-section with rounded ends formed by rounded wall portions 20,21.

A race 22 is provided about a portion of the outer periphery of body portion 11 as seen in the front view of body portion 11 in FIG. 4, the left view in FIG. 5, the right view in FIG. 6 and the back or rear view in FIG. 1. A ball receiving cavity 23 (FIG. 6) is provided in body portion 11. Body portion 11 also includes a shank 24 at its rear end 16 for insertion into a conventional drill chuck. Of course, the shank very easily may be of any suitable diameter depending on the size of the drill chuck. Also, as shown in FIGS. 1 and 4, race 22 terminates at one end in a stop portion 25 (FIG. 4) and at the other end in a ball cavity 26, as will be discussed.

Collar 12 is also generally cylindrical as shown in FIGS. 1 and 7 and includes a hole 28 (FIG. 1) at the front and is imperforate at its rear (FIG. 8). As seen in FIG. 9, collar 12 also has an inwardly extending member 27 or other key means as will be discussed on its left side and, as seen in FIG. 10, a second ball receiving hole 28' on its right side.

As seen in FIG. 11, the rear end view of collar 12 shows a thin peripheral cylindrical wall 29 which is slightly greater in internal diameter than the center peripheral cylindrical wall of body portion 11 so that the collar 12 may be mounted thereto as will be discussed.

Collar 12, at its front end 30, FIG. 8, includes a cut-out portion 31 which, as shown in FIG. 11, is also substantially rectangular in cross-section as section 19 with curved end wall portions 32,33 (FIG. 11).

Tool holder 13, as also seen in FIG. 12, includes an apertured main body portion 34 which is substantially rectangular in cross-section with curved end portions 35,36 (FIG. 12). As will be discussed, body portion 34 conforms to aforementioned cut-out portions 19 and 31, on body portion 11 and collar 12.

A pair of cylindrical apertured bosses 37,38 are mounted on each side of body portion 34 and may be integral with body portion 34 or removably and fixedly secured thereto.

Each boss 37,38 includes an allen screw 39 mounted therein and adapted to be rotated by an allen wrench as is well known in the art. The aperture 40 (FIG. 1) through body portion 34 is aligned with the apertures in bosses 37,38 and screws 39 extend into the apertures in bosses 37,38 to securely hold a tool therein as will be discussed.

Thus, as shown in FIG. 1, one or more tools, such as differing tools 14,15 may be inserted into bosses 37,38 and retained therein by allen screws 39. of course, any type of suitable tool may be so inserted and any suitable securing means may be used.

Thus, tool 14 may be a conventional phillips-head tool having a phillips head at one end. The shank 42 may be inserted into the aperture in boss 37 and retained therein by tightening screw 39. In like manner, tool 15 may be a drill bit having a bit portion 43 at one end and its shank 44 is insertible into the aperture in boss 38 and retained therein by tightening screw 39.

The aperture 40 in body portion 34 may be of any suitable dimensions, such as ¼ or ⅛ inch bore or a combination thereof. If the shank 44 (or shank 42) of the bit tool 15 terminated in a flattened end 45, as is known in the art, and was loose in aperture 40(and the apertures in bosses 37,38,), a removable split ring or collar 46 may be mounted on the end 45 (FIG. 13) and screw 39 tightened thereagainst. Thus, the size relationship of the tools 14,15 and the apertures may be accomodated by such collars 46 or similar spacers.

The final assembled position of chuck 10 is shown in FIG. 14. Collar 12 is inserted over the adjacent end of body portion 11 as seen in FIG. 1. Member 27 may be a depression or the like punched in collar 12 when hole 28' (FIG. 10) is aligned with race 22 (FIG. 4). This would key or lock collar 12 to body portion 11 and allow rotation of collar 12 with respect to body 11. The punched in member 27 rides in race 22 between stops 25 (FIG. 4) and 26 (FIG. 1) on body portion 11. Alternatively, instead of a punched in member 27, a simple removable allen screw or set screw may be threaded in an aperture in collar 12 entering into race 22.

As shown in FIG. 4, a ball 47 is disposed in a hole 48 in a wall of cut-out section 19 on body portion 11 biased by spring 49.

The inner wall of collar 12 retains spring 49 in position biasing ball 47 to the FIG. 4 position. As shown in FIG. 1, a spring biased ball 50 is mounted in cavity 26 at the end of race 22. Ball 50 is biased outwardly of body portion 11 and adapted to enter holes 28,28', respectively, thereby limiting the rotation of collar 12 and body portion 11.

Tools 14 and 15 are now inserted into bosses 37,38, respectively, and set screws 39 are tightened to secure the tools in position. Spacer 46 may be used as theretofore discussed, if necessary. The open end of chuck 10 prior to insertion of the tool holder 13 therein is shown in FIG. 15. When the collar 12 is in the FIG. 15 position, the opening conforms to the body configuration of body portion 34 so tool holder 13 is inserted therein and spring biased ball 47 enters hole or cavity 51 in holder 13.

Collar 12 is now rotated to the FIG. 16 position with the front end 30 surrounding cut-out portion 31 rotating over the walls surrounding cut-out portion 19 of body portion 11 clearly and positively holding tool holder 13 in position. If a tool is disposed in boss 37, such as tool 14, it would obviously extend into throughbore 17 in body portion 11. Of course, the length of the body portion 11 determines the maximum tool length that can be stored internally. In the FIG. 16 position, the spring biased ball 50 (FIG. 1) locks into one of the holes 28 or 28' in collar 12; obviously, the collar 12 can be rotated in the opposite direction if desired, to lock in the other hole 28 or 28'. Also, since body portion 34 has an aperture 40 therethrough, a single bit may be used extending through aperture 40 into body portion 11. Of course, only a single bit can be accomodated at one one time in this arrangement. It can be seen that by merely rotating collar 12 back to the FIG. 15 position, the tool holder 13 can be removed and reversed, if desired. The bias of the balls is easily overcome to rotate the collar between lock and unlock positions.

There is thus disclosed a reversible tool mounting chuck which can hold one on two like or differing bits or screwdriver tools or the like and is extremely versatile and easy to use. Any suitable materials, such as die stamped metal parts, may be used. The chuck may be of any suitable dimensions and the various openings or the like may be selected depending on the application.

Referring now to FIGS. 17 through 31, the second embodiment of this invention is discussed. Turning now to FIG. 17 of the drawing, chuck 110 is shown in an exploded diagram. Chuck 100 comprises three main components, a main chuck body portion 110, a rotatable sleeve or collar 112, and the tool holder 113. The tool holder 113, which is adapted to retain therein one or more tools such as the tools 114 and 115, has been discussed previously with respect to the discussion of tool holder 13 and its associated tools 14 and 15. The tool holders and the tools are the same and further discussion will be brief. The reader is advised that forsaid tool holder and associated tools, that the numbering is similar in that all reference designators have been advanced by 100.

As shown in FIGS. 17-19, the main body portion 111 is generally cylindrical and has a closed rear end 116 as seen in FIG. 19. The main body portion 111 also includes an opening 117 in the front end thereof shown in FIG. 18. As shown in FIG. 20, front end 118 terminates in a front cut out section 119 which is generally rectangular in cross-section but with rounded ends formed by rounded wall portions 120 and 121.

Unlike the first embodiment, here a race 122 is provided in the collar 112, as seen in FIGS. 17, 25 and 28. The race includes a stop portion 125 on each end thereof. A ball receiving cavity 123 is provided behind one of the forwardly extending arms 119 surrounding cut out section 119' while a ball receiving throughbore 152 is drilled normal to the extension of and within the second of the forwardly extending arms 119. Discussion on this will follow in the area pertaining to the collar 112.

Body portion 111 also includes a shank 124 at it s rear end 116 for insertion into an electric drill chuck, not shown. Alternatively as shown in FIG. 31, rear end 116 can terminate in a hollow tubular portion designated 116'. This is closed off by a frictionally engageable, threadable or otherwise secured closure 116A to which is attached the shank 124.

Collar 112 is generally cylindrical as shown in FIGS. 17, 24 and 28. It includes a race/22 as aforementioned, visible in FIG. 28. For ease of rotation a knurled outwardly extending circumscribing lip 126 is disposed at the front of said collar 112.

As shown in FIG. 27, the rear view of the collar 112, said collar has a thin cylindrical peripheral wall 129 that is slightly larger in internal diameter than the diameter of the spaced extending arms 119 such that the collar 112 may be mounted to surround same as seen in FIG. 28. The diameter of this wall 129 is less than the diameter of main body portion 111 such that when said collar is inserted into place, it will not override edge 128 of main body 111. Thus the position of collar 112 can be fixed but it can be rotatably mounted as will be explained below with respect to the further discussion on race 122.

Collar 112 at its front end 130 as shown in FIG. 24 includes a cut out portion 131 which is seen to be substantially rectangular in cross-section per FIG. 27 with curved end walls 132 and 133. In this view the knurled ring 126 can be seen as well.

The fully assembled chuck 110 is depicted in FIG. 28. Collar 112 is inserted over the adjacent end of body portion 111 as seen FIG. 17. A pin 127 is inserted into aperture 123 which is shown in FIG. 22, with the pin therein, but which pin is not to be inserted until after collar 112 is force fit onto body 111. The pin 127 rides in race 122 from stop 125 to stop 125. This locks the collar into position on the body portion while permitting rotation of the collar 112 with respect to the body portion 111.

Attention is now turned to FIG. 20, where ball 147 is seen to be disposed in hole 148 in the wall of arm 119, said ball being biased by spring 149 in bore 148 which is transverse to the arm's extension. The inner wall of collar 112 retains the spring 149 in position thereby biasing ball 147 to the position shown in FIG. 20.

As mentioned above, the ball 127 is incapable of receding into its preferably hemispherical bore 123 and as such protrudes slightly above the surface of the arm 119. Since it rides within race 122, rotation of the collar is limited to the length of the race 122.

One or two tools such as 142 and 143 are set into position within the tool holder such as 112 all of which have been previously discussed, and inserted into opening 117 of the tool. The open end of the the chuck 110 prior to the installation of the tool holder is shown in FIG. 29. The collar 112 is now rotated to the FIG. 30 position after the tool holder is inserted therein. By so rotating the collar the extending arms 119 positively hold the tool holder 113 in position. The tool holder is also retained within the opening of the body by the ball 147 which engages frictionally the hemispherical recess 150. The bias of the balls 147 and 127 is easily overcome to either remove the tool holder 13 or to lock and unlock the collar. Referring now to FIG. 32 of the drawing, a third embodiment of the invention is shown. Mounting chuck 200 is comprised of six main elements, a main chuck body portion 211, a first rotatable sleeve or collar 212, a coil spring 213, a second rotatable sleeve or collar 214, a tool retainer 215 and a tool holder 216. Tool holder 216 is adapted to retain therein one or more tools, such as tools 217 and 218, and is identical to tool holder 13 as previously discussed in connection with the embodiments of FIGS. 1 and 17 other than a pair of annular grooves 219,220 for reasons to be discussed further hereinbelow. Thus, further discussion is deemed unnecessary.

Body portion 211 includes a shank 221 and a threaded portion 222 between shank 221 and a tapered portion 223 closing off one end of body portion 211 leading to a first cylindrical portion 224. A second cylindrical portion 225, of reduced cross-section, extends from first cylindrical portion 224. As seen in FIG. 33, body portion 211 is hollow with an internal shoulder 226 formed at the junction of portions 224 and 225. An outer shoulder 227 is also formed at the junction of portions 224 and 225.

Collar 212 is a hollow cylindrical member, open therethrough, having an internal shoulder 228 as seen in FIG. 34. Shoulder 228 may be formed by having the internal wall sections of differing diameters.

As shown in FIG. 35, collar 212 fits over portion 225 until its internal shoulder 228 abuts against end 229 of portion 225 with its end 230 abutting against outer shoulder 227.

Collar 214 fits over the cylindrical end 231 of tool retainer 215. Collar 214 includes an internal shoulder 232 (FIG. 36) which may be provided by making one end thereof of a thinner wall construction. Tool retainer 215 includes a main cylindrical body portion 233, which may be greater in outer diameter than end 231, forming a shoulder 234, and a tool holder receiving end 235 which is otherwise identical to that portion of the embodiment of FIG. 1 described hereinabove in connection with the description of FIG. 2 so that further description is deemed unnecessary. However, in this embodiment of the invention, only a stationary internal tool holder receiving opening is provided since the rotatable collar sections are not necessary in this embodiment.

Finally, a ball receiving hole 237 is provided in body portion 233 for receiving ball 238 therein. One or more such balls and holes therefor may be provided, if desired.

In assembling the chuck of FIG. 32, ball 238 is inserted from the outside of retainer 215 so it enters the aperture 237, the diameter of the aperture 237 being greater than the greatest diameter of ball 238 to retain the ball therein as seen in FIG. 38.

Sleeve 214 is placed over body portion 233 retaining the ball in position as shown in FIG. 38. It can be appreciated that pulling back on sleeve 214, in the direction of arrow 243 in FIG. 35, allows the internal portion thereof which is of lesser diameter than the remaining internal portion as provided by its thinner wall construction, to encirce ball 238 permitting ball 238 to move slightly out of the FIG. 38 position locked into groove 219 or 220. Thus, when tool holder 216 is inserted into tool retainer 215 as discussed hereinabove with respect to the embodiments of FIGS. 1 and 17, ball 238 enters groove 219 (or 220) locking the holder 216 in position (portion 240, otherwise similar to portion 34 of FIG. 1. enters opening 236 and is retained therein by abutting walls of hemispherical portions 241, 242 - see FIGS. 37 and 38).

Spring 213 is now placed over end 231 and abuts against sleeve 214. Spring 213, and end 231, are now inserted into collar 212, abutting against internal shoulder 226 (FIG. 33) of body portion 211. The final assembled position is shown in FIG. 35.

In operation, holder 216 is inserted into the assembled portions 211, 212, 213, 214 and 215 with either tool 217 or 218 entering the axial passage therethrough as previously discussed. Portion 240 fits into opening 236 on each side of portions 241, 242 of retainer 215. Ball 238 enters groove 219 (or groove 220) locking holder 216 in retainer 215. After use of the tool 217 or 218, as heretofore discussed, the operator merely moves sleeve 214 in the direction of arrow 243 in FIG. 35 which allows ball 238 to enter the reduced internal diameter section of sleeve 214 thereby moving slightly back from its FIG. 38 position to thereby exit out of groove 219 or 220 a sufficient distance to permit withdrawal of holder 216. In this manner, either tool 218 or 217 can be quickly and easily presented for use.

FIG. 39 is a view similar to that of element 13 in FIG. 1. This tool holder, a variant of tool holder 13, is capable of being employed in any of the embodiments of the tool disclosed herein. It is designated element 313. FIG. 39 is a view similar to that of FIG. 12 for the first tool holder disclosed. This tool holder 313 also has an apertured main body portion 334 which is substantially rectangular in cross-section with curved end portions 335 and 336. The body portion has a length substantially less than that of body portion 34 of holder 13, namely only about 0.25 inches. Body portion 334 conforms to the the aforementioned cut out sections 19 and 31 and 119 and 131 as previously discussed.

A pair of cylindrical apertured bosses 337 and 338 are mounted on opposite sides of body portion 334, preferably integral therewith. Each boss 337 and 338 includes an allen screw 339 mounted therein and adapted to be rotated by an allen wrench as is well known to the art. A throughbore shown in dotted line and designated 340 runs through both bosses and the body portion and is normal to and communicates with the threaded apertures in the bosses which hold the aforementioned allen screws. The allen screws 339 extend into the bore 340 to hold one or more tool bits such as 314 and 315 in place.

To digress but a moment, since the throughbore 340 extends all the way through, an oversize drill bit, not shown, can be inserted into one boss 338 and extended out the other side through boss 339 if desired. The tool holder can then serve the dual function of tool holder and hole depth limiter. To do so, the single tool bit would extend only the desired depth of hole desired from one of said bosses, and the hole would be drilled down to the body portion which acts as a stop. Specific tools to serve such function are known to the art. This is just an added feature here.

Each boss also includes a circumscribing ball receiving depressed ring 341 and 342 respectively, disposed between the front edge of the boss and its respective allen screw. See also FIG. 40. Ball 147 for example would engage such ring when the tool holder is inserted into a collar such as 112. The manufacture of the tool holder 313 is seen to be less expensive than tool holder 13, as it is smaller and the ball receiving ring can be lathe turned.

Thus one or more different tools 314 and 315 may be inserted into the bosses 337 and 338 and retained therein. While a drill bit and phillips head screw are shown, the flat head screw driver such as 114 can be used here as well as can other related chuckmounted tools. The shank is inserted into the appropriate boss and the allen screw 339 tightened to secure the tool therein.

Turning now to another means of mounting any of the body portions of the instant tool to the drill itself, the reader's attention is turned to FIGS. 41 and 42. It is seen here that the base 351 of the body portion 350 is built up such that it can be bored out as shown. Rather than employ a mounting shank, secured at point or opening 352, a threaded bore 353 is provided therein. This is constricted at the top for the insertion of threaded bolt 354, which threads not into bore 353, but into tip 356's threaded bore 357. Tip 356 is the mounting tip of a typical quarter or half inch drill and is used for the mounting of the Jacobs or other chuck for the drill. Tip 356 itself threads into bore 353 and is locked into same by bolt 354 which is inserted from the top of elongated body portion, here 350. Obviously this base can be adapted to any of the embodiments of the tool disclosed herein.

Reference is now made to the fourth embodiment of the instant invention. See FIGS. 43 and 44. This version is similar to a degree to that shown in FIGS. 32 et seq. and bearing the 200 series of designator numbers.

Turning to the drawings, it is seen that mounting chuck 400 is comprised of a plurality of elements; namely a main body portion 411, a collar 412, a coil spring 413, a handle portion 414, and a seal 415. Only the handle 414 which serves as a case is shown in a cutaway cross section for ease of understanding. The tool holder portion is not shown, since any of the tool holders aforementioned may be employed herewith.

Body portion 411 includes a shank 416 which is internally threaded 417 adapted to threadingly engage a head portion of a quarter inch or larger drill, per FIG. 5 and a first cylindrical portion 419. The body 411 is hollow throughout, with the bore decreasing in size at the junction 420 of the shank with the first cylindrical portion 419. This junction 420 is a shoulder.

Collar 412 is a hollow cylindrical member that is open therethrough, and which has an internal shoulder 428 which is depicted in FIG. 47. This shoulder is most easily formed by having the internal wall of part 412 have different thicknesses. As shown in FIG. 44 the collar 412 fits over the cylindrical portion 419 of body 411, and abuts the forwardly extending spaced and opposed hemispherical sections 441 and 442, per FIG. 46 at the rear surface thereof 421 and 422 respectively. The outside diameter of collar 412 corresponds to the O.D. of the spaced members 441 and 442, as is seen in FIG. 44.

The tool receiving front end of the body portion 411 is similar to that described with respect to the first embodiment and to the tool receiving front end 235 of the third embodiment previously described in detail. Here, too, as in the embodiment described with the 200 series numbers, only a stationary tool holder receiving opening is provided since the rotatable collar sections are not involved in this embodiment.

A ball receiving race 437 of a diameter greater than that of ball 438 is provided in the body portion 411 to receive the ball 438-FIG. 44 therein. While only one such ball is shown in FIG. 43 a plurality of same may be employed. Race 437 terminates in an aperture 439 slightly narrower than the greatest diameter of the ball 438 to prevent the ball from leaving the race.

In assembling the tool of this embodiment, the ball 438 is inserted from the outside and is retained therein by collar 412. When the collar is retracted per the direction of arrow 443 of FIG. 44, the wider internal diameter of the collar 412, the ball 438 can flow into the race 437 thereby permitting easy placement of a tool holder such as 216 previously described to be inserted therein. Releasing of the collar against the arrow 443 brings the narrower internal diameter of the collar 412 into contact with the ball 438 thus forcing it into the race where it projects slightly beyond the aperture 439 to engage the groove 219 or 220 of the tool holder shown in FIG. 32. The ball 438 on entering said groove 419 or 420 locks the tool holder 216 into place for utilization. Portion 240 of this tool holder which is similar to portion 34 of the tool holder shown in the first embodiment locks into place in the opening 436 of the tool receiving front end 435 in the same manner as discussed with respect to the discussion on the tool holders previously. Reference is made to the discussion on the insertion of the holder into the assembled portions 211, 212, 213, 214, and 215 which set forth such details.

The coil spring 413 is now placed over the first cylindrical portion 419 such that the leading edge of said spring impinges upon the trailing edge of the collar 412, per FIG. 44.

Case 414 which serves as a handle, is a hollow cylinder having an annular closure 425 at one end. Case 414 includes either an optional stop 423 upon which the lower end of the coil spring 413 impinges, or it includes a shoulder designated 423'. If a shoulder this would be formed by having the section of the case from 423' to the rear end thereof be of a reduced diameter. The internal diameter of the case would be slightly larger than the outside diameter of body portion 411 to permit the case to be rotated with respect to the body portion which nests therein. The use of the constricted lower portion of the case 414 permits a non-wobbled fit of the body portion 411 therein, while still permitting rotation.

The distance from stop 423 or shoulder 423' to the leading edge 426 of case 414 is greater than the length of the collar 412 such that the collar can be retracted down to the 423 (423') point since the opening in said case is sized to permit the collar 412 to descend therein.

Annular end 425 per FIG. 45 includes a disc segment 415 and an opening 427 sized to receive shank 416 therein. Shank 416 protrudes through opening 427 and is secured in place by flexible disc segment 415 which abuts annular end 425 of case 414.

Turning now to a variant in the body portion of the invention, which is applicable to every embodiment.

Previously the tool holder receiving section of the body portion included a round opening into which the tool holder such as tool holder 13 would be fitted. A variant of same is shown in FIGS. 51 and 52. The essence of the difference is that the interface between the tool holder and the tool holder receiving portion is hexagonal and not round. Reference is made to the early drawings such as FIG. 1 for comparison, as well as the FIG. 39 which resembles a rounded corner rectangle. Another slight difference is the chamfering of the front surface, all of which will be described below.

Tool holder 513 includes a cylindrical rear body portion 514 a second portion on one side of the centerline which is designated 516 and which is hexagonal in cross-section. It is this hexagonal section that engages in the hexagonal opening 508 of the tool holder receiving portion of the fifth embodiment of the tool 507 to be discussed below. The hexagonal portion conforms to the front body portion 501 of the fifth tool embodiment as shown in FIG. 48, while the rear cylindrical portion conforms to the second body portion 502 beneath the collar 504.

Hexagonal portion 516 contains a threaded opening 517 for receiving an allen screw 518 which allen screw serves to secure drill bit 521. The third portion is the cylindrical front portion 519. This front portion is of the same diameter as the rear portion 514. The front and rear portions may be integral with the hexagonal middle portion. Throughbore 523 through all three portions is aligned therethrough and is normal to the threaded opening 517 such that screw 518 can extend into said throughbore to secure the bit 521 in the manner alluded to previously. While a drill bit is shown, any secureable tool such as a screwdriver can be inserted and secured into the tool holder 513 in the same manner as with the tool holders previously discussed.

Groove 515 around rear body section 514 is adapted to receive the ball 505 disposed within body portion 502 of the 5th embodiment of this invention, in like manner as with the previously discussed tool holders. Groove 520 is non-functional and merely provides aesthetics consistent with the two tool receiving tool holders above and as shown in FIG. 53 which is an alternate to the holder of FIG. 51 adapted to hold two tools. The front surface of front section 519 has been chamfered slightly to permit ease of handling.

FIG. 52 is a rear elevational view taken along lines LII—LII of the tool holder of FIG. 51. As can be seen this version is intended to hold only one bit or driver, which can be of such a length that it extends the full length of the tool holder 513. Since the tool holder is not intended to be reversibly mounted, an extremely long bit such as might be used for drilling through floor joists can be accomodated.

Turning now to FIG. 53, there is depicted the reversible version of the tool holder of FIG. 51. It is designated here as 513A. The sole distinction is that both ends are intended to receive tools or bits such as 521 and 521A, the latter being a screw driver. Portion 514A is similar to the 514 previously described with respect to FIG. 51, as are the two grooves 515 and 520 both of which are functional, though only the one that is rearwardly disposed is operatively engaged at the time of use. Here two allen screws 518 are employed in their respective apertures 517 to retain the two tools in place that are disposed in the throughbore 523.

Returning now for a further discussion of FIG. 48, it is seen that the embodiment of this figure is related to the embodiment of FIG. 43. The mounting chuck of this embodiment 500 is comprised of a plurality of elements, namely a main body portion 503, a collar 504, a coil spring 506, a rear seal 509.

The main body 503 is integrally connected to the second body portion 502, which in turn is integrally connected to the first portion 501. First body portion 501 has a round outer configuration for wall 507 best seen in FIG. 49. The interior opening therein is hexagonal, sized to receive the hexagonal portion of the tool holders 513 and 513A. The interior configuration of the second body portion 502, which is of slightly smaller cross section than the first portion 501, in order to receive the collar 504 in circumscribing relationship, is round in its interior. The integral body is hollow its entire length.

In this view the collar 504 is shown slightly withdrawn to reveal the locking ball 503 which engages the groove of the tool holder in the manner previously described with respect to other embodiments. The collar moves rearwardly as shown by arrow 512. The outside diameter of the collar corresponds to the outside diameter of the first body portion 501. Preferably, as shown, the collar is knurled for easy grasping for movement rearwardly.

The coil spring 506 surrounds the lower part of the second body portion and rests at one end on the rear edge of the collar 504 and at its other end on the shoulder 513 of the main body portion 503. Case or handle 511 surrounds the main body portion and acts as handle, since the main body portion will rotate freely in the case 511 during use of the tool.

In the open end of the main body portion designated 515, the seal 509 is frictionally engaged. The forward end of said seal 523 is sized to frictionally fit within the open end of the main body portion 503, namely 530. Threaded bore 524 is adapted to receive the chuck mounting screw 525 shown in FIG. 54. The bore 524 communicates with the central bore of the body portions.

Reference should also be made to the view FIG. 50 which is taken along line LI—LI which shows the case 511 and its threaded bore 524.

In operation, this fifth embodiment operates in a manner similar to the fourth one previously described.

Since certain changes may be made in the above apparatuses without departing from the scope of the invention herein involved, it is intended that all matter contained in the above description and shown in the accompanying drawings shall be interpreted as illustrative and not in a limiting sense.

I claim:

1. A mounting chuck adapted to contain one or more working tools in a position for use comprising:

a main body portion having an elongated axial passageway extending therethrough opening at one end and closed at the other end, and an elongated shank extending from said closed end coaxially aligned with said passageway for coupling said chuck to a drill;

a cylindrical member mounted in the open end of said main body portion having an axial passageway coaxial with the elongated axial passageway in the main body portion, said member terminating in an open end and having a cut-out wall section, said cutout wall section having parallel spaced internal walls and an aperture extending through said wall section and a detent in said aperture extending partly into said axial passageway therethrough but restrained from entering said passageway entirely, by the wall surrounding said aperture being less in diameter than the diameter of said detent;

a first collar rotatably mounted on the outer periphery of said member encircling said aperture and retaining said detent between the wall surrounding said aperture and the inner wall of said collar, said collar having inner wall portions of two differing diameters, one of said inner wall portions engaging said detent in a position whereby said detent extends into said axial passageway and the other of said inner wall portions being spaced a sufficient distance from the outer wall of said member to permit said detent to withdraw slightly out of said axial passageway in said member;

resilient means between said member and said body portion and said first collar normally biasing said first collar toward said open end of said body portion;

a tool holder having a main body portion having a configuration substantially the same as said cut-out wall section and insertible therein, said main body portion of said tool holder having an axially extending passageway axially aligned with the axial passageways through said member and said first mentioned main body portion, and a pair of bosses on both sides of said body portion of said tool holder, each of said bosses having apertures therein aligned with the passageway through said tool holder main body portion, and each of said bosses having tool retaining means therein adapted to extend into the apertures in said bosses to engage a tool inserted therein to thereby retain a tool in fixed position in said boss, each of said bosses having an annular groove therein adapted to receive said detent to lock said tool holder in said member only when said detent is in said groove, said tool holder being disposed in said main body portion with said detent entering said groove in one of said bosses; and a second collar encircling a portion of the open end of said body member, said resilient means and the outer wall of said first collar, said second collar being freely rotatable and axially fixed relative to said first collar and adapted to serve as a handle whereby axial movement of said first collar against the bias of said resilient means toward the closed end of said main body portion allows said detent to withdraw slightly out of said passageway through said member and into said groove in said boss while release of said first collar permits said resilient means to bias said first collar back to its normal position where said detent extends slightly into said passageway through said member and into said groove in said boss.

2. In the chuck of claim 1 wherein said resilient means is a coil spring surrounding said member and abutting, at one end, against the open end of said body portion, and, at its other end, against said first collar.

3. In the chuck of claim 1 wherein said detent is a ball.

4. A mounting chuck adapted to contain one or more working tools in a position for use comprising:

a first main body portion open at one end and having drill connecting means for coupling said chuck to a drill at the other end;

a tool holder having a second main body portion with an axially extending passage and a pair of bosses on both sides of said second main body portion of said tool holder, each of said bosses having apertures therein aligned with the passage in said second main body portion, and each of said bosses having tool retaining means therein adapted to extend into the apertures in said bosses to engage a tool inserted therein to thereby retain a tool in fixed position in said boss; and tool holder engaging and disengaging means coupled to both said first main body portion and said tool holder for selectively engaging and disengaging said tool holder from said first main body portion; and said first main body portion having a tool holder receiving end and a portion having a lesser outer diameter adjacent the tool holder receiving end and said tool holder engaging and disengaging means being a first collar encircling said lesser outer diameter portion, a coil spring surrounding said first main body portion engaging the rear end of said first collar, and biasing said first collar toward the open end of said first main body portion heretofore first mentioned, said first collar being substantially the same outer diameter as the tool receiving end, a ball race in said main body portion, said collar having a reduced inner diameter portion and a wide inner diameter portion, a ball in said race with said reduced inner diameter portion normally retaining said ball in said race whereby retraction of said collar away from the open end of said main body portion against the bias of said spring to a position whereby said wide inner diameter portion surrounds said ball permitting said ball to enter said race to permit easy disengagement of said tool holder and release of said collar against said spring bias forces said ball into said race to engage a groove in said tool holder to engage said tool holder, and a second collar encircling a portion of the first main body portion, said coil spring and the outer wall of the first collar, said second collar being freely rotatable and axially fixed relative to the movement of the first collar and adapted to serve as a handle.

5. In the chuck of claim 4 wherein said drill connecting means is an end cap removably secured to the other end of said first mentioned main body portion, said cap having a shank adapted to engage a drill extending axially therefrom.

6. In the chuck of claim 4 wherein said drill connecting means is a removable threaded insert which may be the tip of a drill, said insert having a threaded bore, said insert being threaded into a threaded aperture in the closed end of said first mentioned main body portion, and a bolt having an enlarged head mounted internally of said main body portion and a threaded shank extending through threaded aperture and threaded into the bore of said insert.

7. In the chuck of claim 4 wherein said handle portion includes a disk segment with an opening therein, said main body portion having a shank forming said drill connecting means extending through said opening in said disk segment.

8. In the chuck of claim 7 including a flexible washer encircling said shank securing said disk segment to said main body portion.

9. In the chuck of claim 4 wherein said main body portion of said tool holder is hexagonally shaped and said first mentioned main body portion includes a like hexagonally shaped opening receiving said main body portion of said tool holder therein.

* * * * *